(12) United States Patent
Huang

(10) Patent No.: US 6,783,313 B1
(45) Date of Patent: Aug. 31, 2004

(54) CONCEALABLE BUCKLE APPARATUS

(76) Inventor: Han-Ching Huang, No. 12 Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 10/700,436

(22) Filed: Nov. 3, 2003

(51) Int. Cl.[7] .................................................. B60P 7/08
(52) U.S. Cl. ........................ 410/106; 410/102; 410/107; 410/111
(58) Field of Search ................................ 410/101, 102, 410/106, 107, 108, 109, 110, 111, 112, 113, 114, 116; 24/265 CD, 115 K; 248/499

(56) References Cited

U.S. PATENT DOCUMENTS

| | | | | |
|---|---|---|---|---|
| 2,587,882 A | * | 3/1952 | Oakley | 410/107 |
| 2,756,693 A | * | 7/1956 | Frost | 410/116 |
| 3,572,755 A | * | 3/1971 | Baldwin | 410/110 |
| 4,903,876 A | * | 2/1990 | Bott | 224/321 |
| 4,907,921 A | * | 3/1990 | Akright | 410/111 |
| 6,065,917 A | * | 5/2000 | Shambeau et al. | 410/107 |
| 6,138,975 A | * | 10/2000 | McDaid | 248/499 |
| 6,523,800 B2 | * | 2/2003 | Hsu | 248/499 |
| 6,533,512 B2 | * | 3/2003 | Lin | 410/102 |
| 6,547,474 B1 | * | 4/2003 | Smetz | 403/78 |
| 6,665,911 B1 | * | 12/2003 | Huang | 24/68 CD |

FOREIGN PATENT DOCUMENTS

| | | | | |
|---|---|---|---|---|
| DE | 004000722 | * | 7/1991 | 410/111 |
| EP | 000424650 | * | 5/1991 | 410/107 |
| GB | 2009058 | * | 6/1979 | |
| GB | 2167354 | * | 5/1986 | |
| WO | 91/04883 | * | 4/1991 | |

* cited by examiner

Primary Examiner—D. Glenn Dayoan
Assistant Examiner—H. Gutman
(74) Attorney, Agent, or Firm—Charles E. Baxley

(57) ABSTRACT

A concealable buckle apparatus includes a panel, a locking element, a shaft and a buckle. The panel includes a recess and a margin formed about the recess. The recess includes a bottom and a wall projecting from the bottom and two slots extending from the bottom to the wall. The locking element includes a concave first portion, a convex second portion extending from the first portion, a concave third portion extending from the second portion and a fourth portion extending from the third portion. The fourth portion of the locking element is secured to the bottom of the recess. The shaft is put between the locking element and the bottom of the panel. The buckle includes two lateral portions inserted through the slots and secured to the shaft and a central portion formed between the lateral portions. The buckle is concealed in the recess when the shaft is retained in the first portion of the locking element. The buckle is completely extended from the recess when the shaft is retained in the third portion of the locking element.

6 Claims, 7 Drawing Sheets

CONCEALABLE BUCKLE APPARATUS

FIELD OF INVENTION

The present invention relates to a concealable buckle apparatus.

BACKGROUND OF INVENTION

Referring to FIGS. 8 and 9, a conventional concealable buckle apparatus includes a supporting element 70, a buckle 75, a locking device 80 and a panel 85. The buckle 75 is pivotally mounted on the supporting element 70 between an extended position and a concealed position. The locking device 80 is movably mounted on the supporting element 70 between a locking position and a releasing position. In the locking position, the locking device 80 locks the buckle 75 in the concealed position. The panel 85 is mounted on the supporting element 70 and defines an opening 41 through which the buckle 75 extends in the extended position and a slot 43 through which the locking device 80 is accessible. The concealable buckle apparatus may include a torque spring 90 for biasing the buckle from the concealed position to the extended position. The concealable buckle apparatus however includes a complicated structure and involves complicated fabrication and results in a high cost.

The present invention is therefore intended to obviate or at least alleviate the problems encountered in prior art.

SUMMARY OF INVENTION

The primary objective of the present invention is to provide a structurally simple concealable buckle apparatus.

According to the present invention, a concealable buckle apparatus includes a panel, a locking element, a shaft and a buckle. The panel includes a recess and a margin formed about the recess. The recess includes a bottom and a wall projecting from the bottom and two slots extending from the bottom to the wall. The locking element includes a concave first portion, a convex second portion extending from the first portion, a concave third portion extending from the second portion and a fourth portion extending from the third portion. The fourth portion of the locking element is secured to the bottom of the recess. The shaft is put between the locking element and the bottom of the panel. The buckle includes two lateral portions inserted through the slots and secured to the shaft and a central portion formed between the lateral portions. The buckle is concealed in the recess when the shaft is retained in the first portion of the locking element. The buckle is completely extended from the recess when the shaft is retained in the third portion of the locking element.

Other objects, advantages, and novel features of the invention will become more apparent from the following detailed description when taken in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 2:
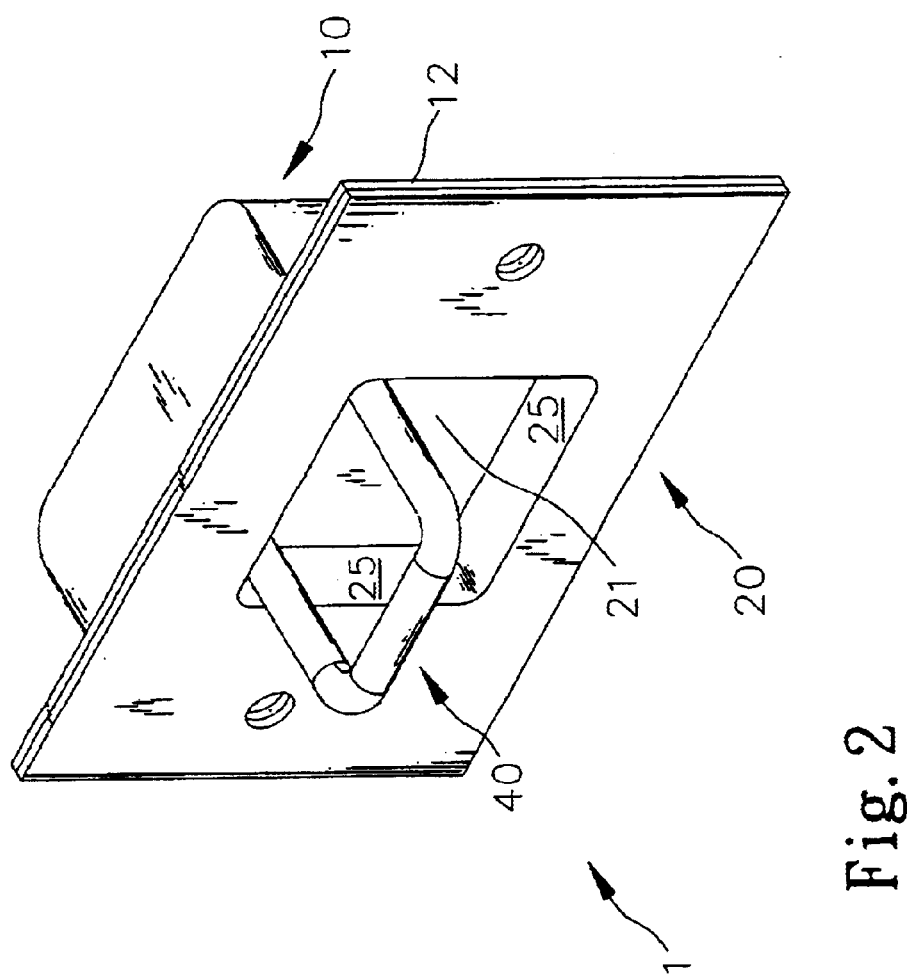
FIG. 2 is a perspective view of one of the concealable buckle apparatuses of FIG. 1.
Figure 3:
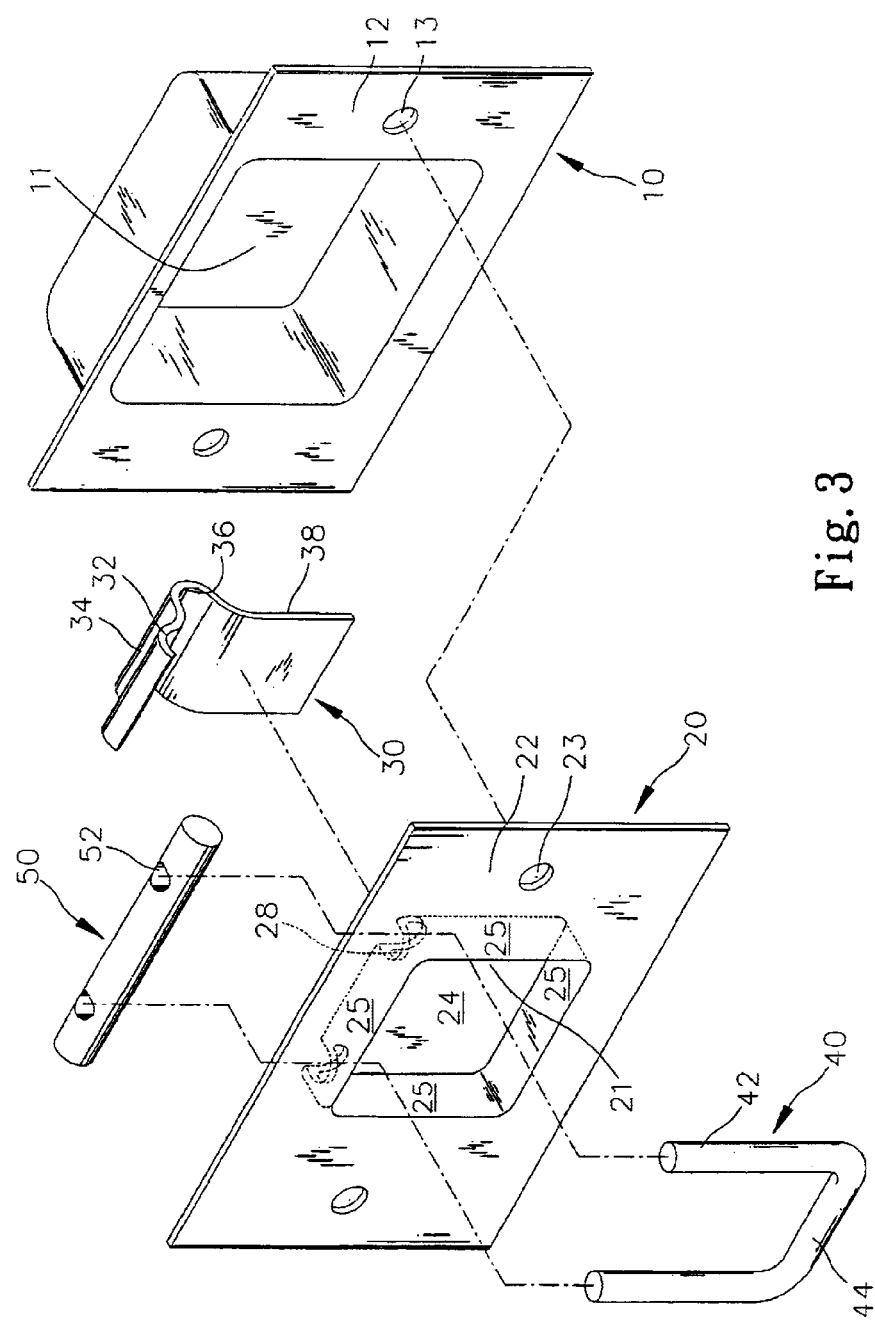
FIG. 3 is an exploded view of the concealable buckle apparatus of FIG. 2.

Referring to FIGS. 2 and 3, according to the preferred embodiment of the present invention, a concealable buckle apparatus 1 includes a casing 10, a panel 20, a locking element 30, a buckle 40 and a shaft 50.

The casing 10 includes a recess 11 defined therein, a margin 12 formed about the recess 11 and two apertures 13 defined in the margin 12. The recess 11 is located between the apertures 13.

The buckle 40 includes a U-shaped configuration. That is, it includes two lateral portions 42 and a central portion 44 formed between the lateral portions 42 for supporting a rope or strap.

The panel 20 includes a recess 21 defined therein, a margin 22 formed about the recess 21 and two apertures 23 defined in the margin 22. The recess 21 is located between the apertures 23. The recess 21 includes a bottom 24 and four walls 25 extending from the bottom 24. Two slots 28 extend from the bottom 24 to one of the walls 25 for receiving the lateral portions 42.

The shaft 50 defines two apertures 52 each for receiving one of the lateral portions 42.

The locking element 30 includes a first portion 32, a second portion 34 extending from the first portion 31, a third portion 36 extending from the second portion 34 and a fourth portion 38 extending from the third portion 36. The first portion 32 and the third portion 36 are concave while the second portion 34 is convex. The fourth portion 38 is flat and secured to the back of the panel 20.

The shaft 50 is put between the panel 20 and the locking element 30. The lateral portions 42 of the buckle 40 are inserted through the slots 24 of the panel 20 into the apertures 52 of the shaft 50. The lateral portions 42 of the buckle 40 are secured to the shaft 50. Thus, the buckle 40 is retained on the panel 20.

Figure 1:
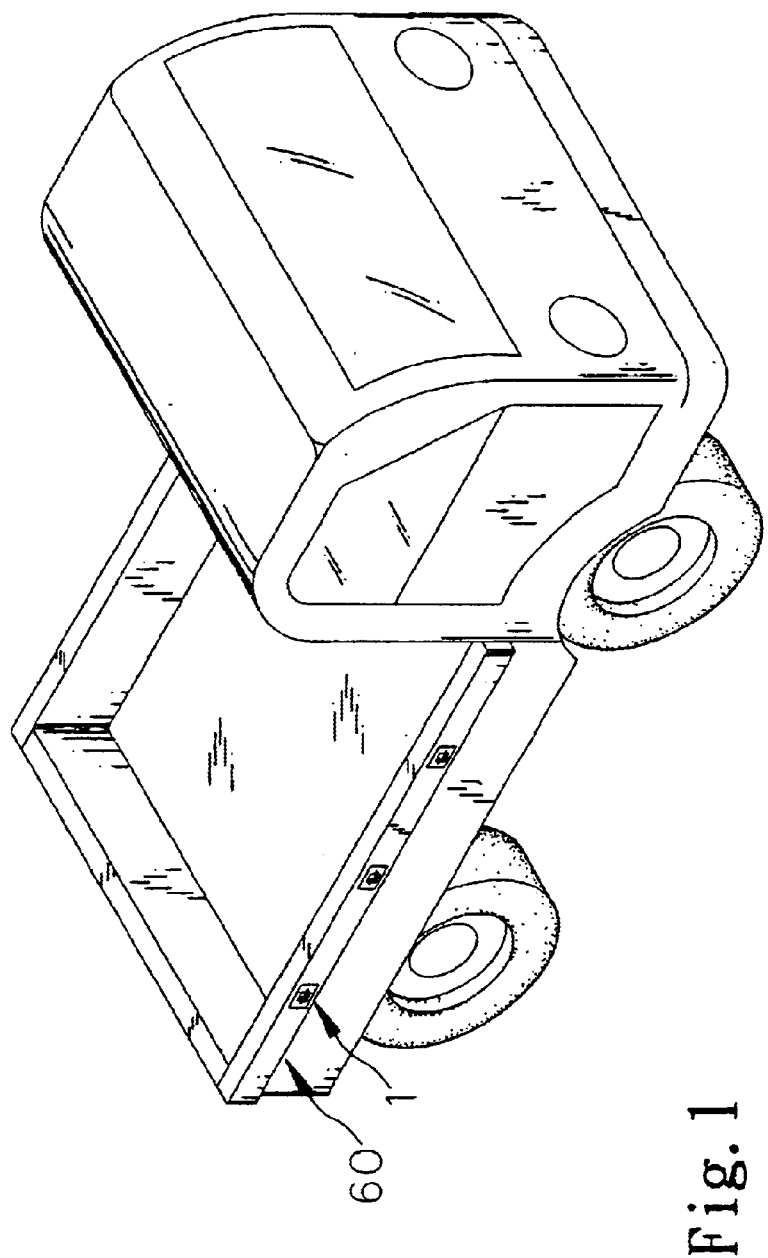
FIG. 1 is a perspective view of a vehicle on which several concealable buckle apparatuses are installed according to the preferred embodiment of the present invention.
Figure 4:
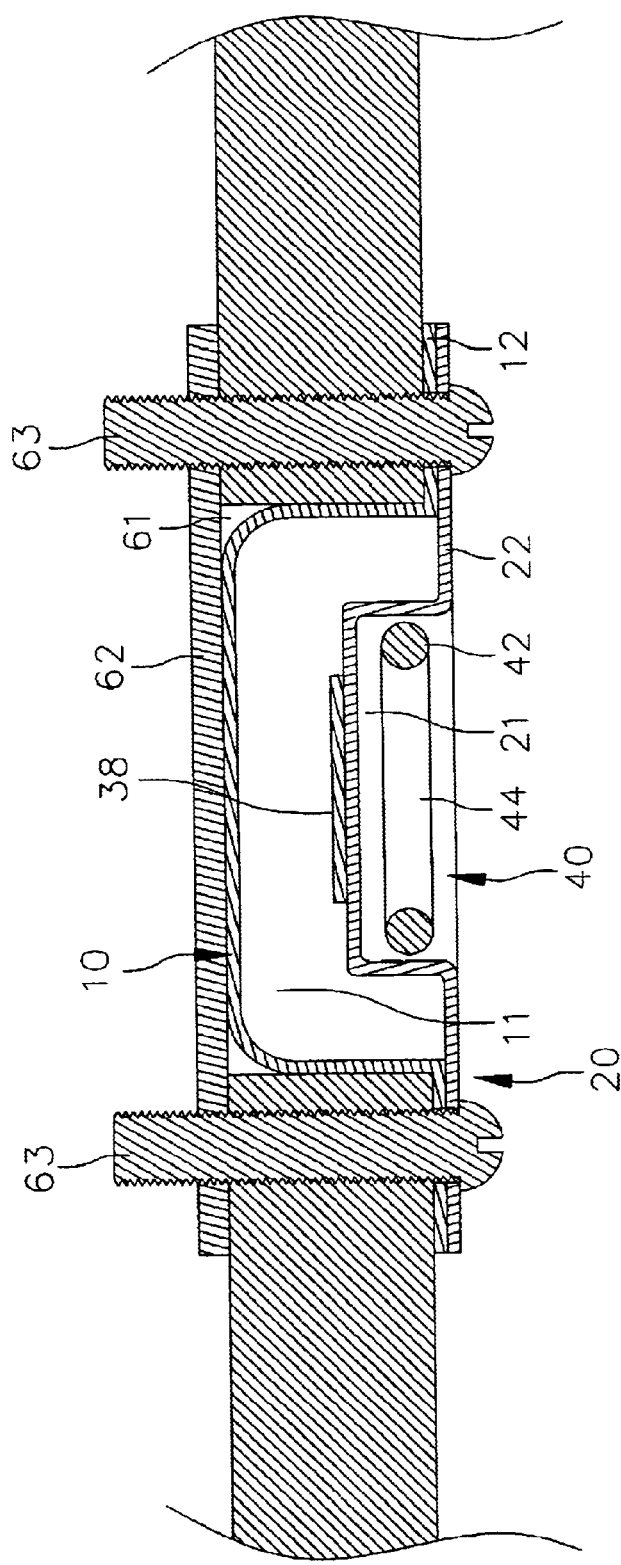
FIG. 4 is a cross-sectional view of one of the concealable buckle apparatuses of FIG. 1.

Referring to FIGS. 1 and 4, a vehicle 60 includes several openings 61 each for receiving the recess 11 of the casing 10 of a concealable buckle apparatus 1. The panel 20 is put next to the casing 10 so that the locking element 30 is put between the panel 20 and the casing 10. A locking plate 62 is located against the vehicle 60 and the recess 11. Two bolts 63 are driven into the locking plate 62 and the vehicle 60 through the apertures 23 and the apertures 13. Thus, the panel 20 is secured to the casing 10, and the whole concealable buckle apparatus 1 secured to the vehicle 60.

Referring to FIG. 1, more than one concealable buckle apparatus 1 can be installed on the vehicle 60 and can securely hook a rope for holding cargo on the vehicle 60.

Figures 5, 6, 7:
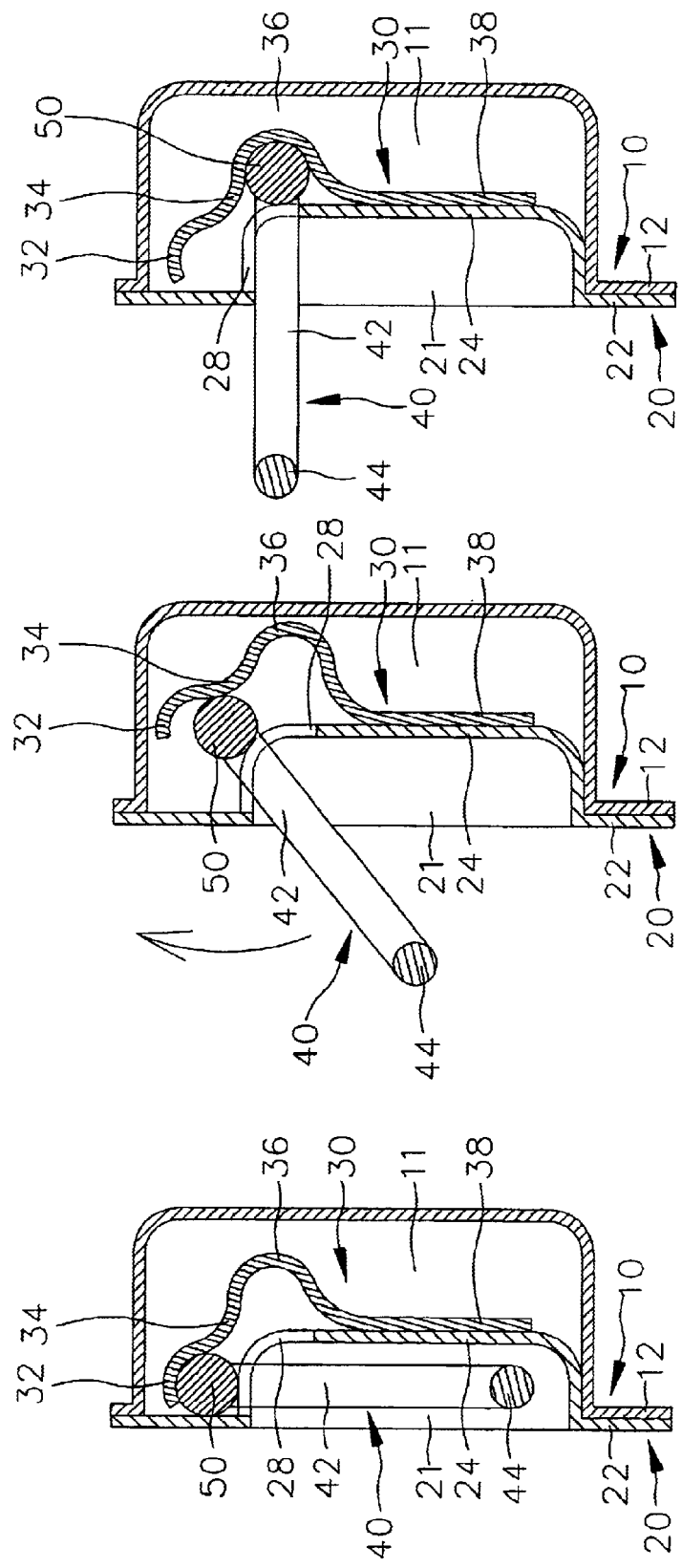
FIG. 5 is a cross-sectional view of the concealable buckle apparatus of FIG. 2 in a concealed position.
FIG. 6 is similar to FIG. 5 but shows the buckle in a position between a fully extended position and the concealed position.
FIG. 7 is similar to FIG. 6 but shows the buckle in a fully extended position.
Figure 8:
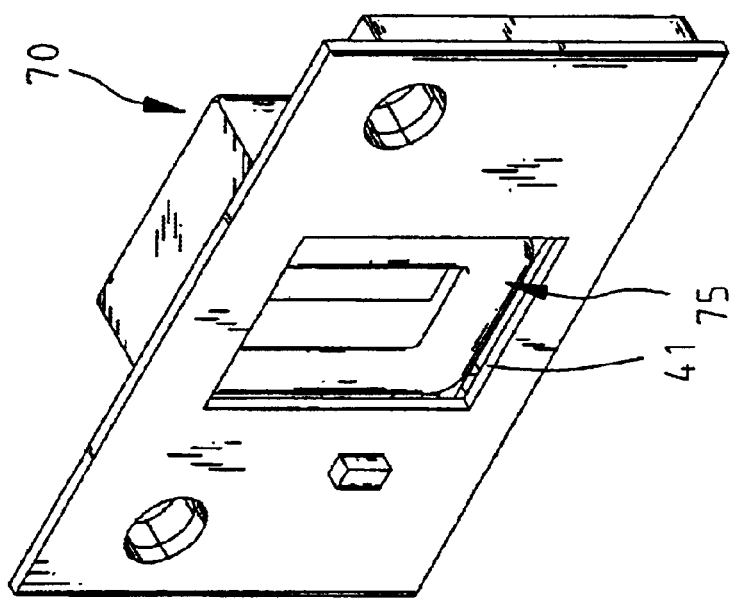
FIG. 8 is a conventional concealable buckle apparatus.
Figure 9:
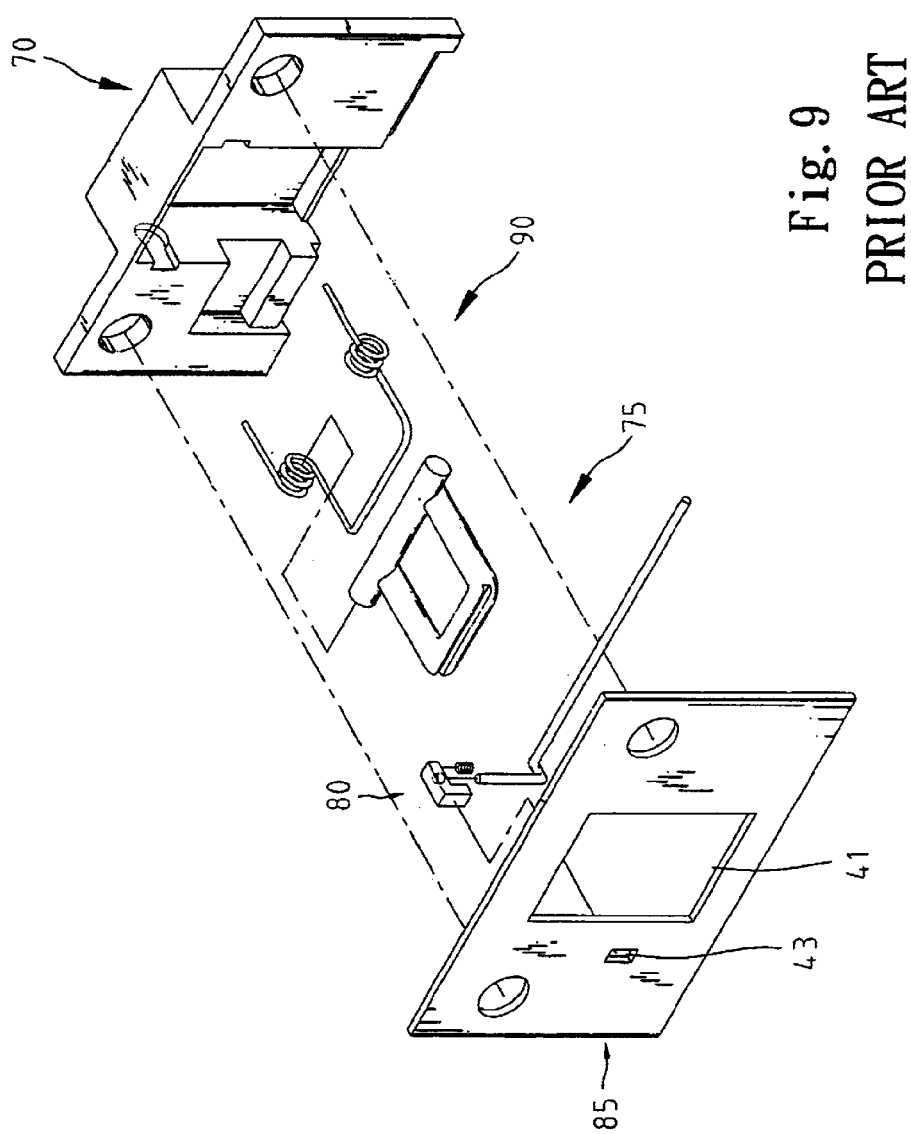
FIG. 9 is a conventional concealable buckle apparatus.

Referring to FIG. 5, the buckle 40 is concealed in the recess 21. The shaft 50 is put in the first portion 32 of the locking element 30. Thus, the buckle 40 is retained in the concealed position.

Referring to FIG. 6, to use the buckle 40, the buckle 40 is pivoted from the recess 21. The shaft 50 is moved past the second portion 34 of the locking element 30.

Referring to FIG. 7, the buckle 40 is pivoted to a completely extended position. The shaft 50 is put in the third portion 36 of the locking element 30. Thus, the buckle 40 is retained in the completely extended position. The rope or strap (not shown) is wound about the central portion 44 of the buckle 40.

The present invention has been described through detailed illustration of the preferred embodiment. Those skilled in the art can derive variation from the preferred embodiment without departing from the scope of the present invention. Therefore, the preferred embodiment shall not limit the scope of the present invention defined in the claims.

What is claimed is:

1. A concealable buckle apparatus comprising:
   a panel including a recess and a margin formed about the recess, the recess including a bottom and a wall projecting from the bottom and two slots extending from the bottom to the wall;
   a locking element including a concave first portion, a convex second portion extending from the first portion, a concave third portion extending from the second portion and a fourth portion extending from the third portion, wherein the fourth portion of the locking element is secured to the bottom of the recess;
   a shaft put between the locking element and the bottom of the panel; and
   a buckle including two lateral portions inserted through the slots and secured to the shaft and a central portion formed between the lateral portions, wherein the buckle is concealed in the recess when the shaft is retained in the first portion of the locking element, and the buckle is completely extended from the recess when the shaft is retained in the third portion of the locking element.

2. The concealable buckle apparatus according to claim 1 wherein the shaft defines two apertures each for receiving one of the lateral portions of the buckle.

3. The concealable buckle apparatus according to claim 1 including a casing for receiving the locking element, the shaft and the recess of the panel.

4. The concealable buckle apparatus according to claim 3 wherein the casing includes a recess receiving the locking element, the shaft and the recess of the panel and a margin extending from the recess for attachment to an external article.

5. The concealable buckle apparatus according to claim 4 wherein the margin of the panel is secured to the margin of the casing.

6. The concealable buckle apparatus according to claim 5 including two bolts, wherein the margin of the panel defines two apertures, and the margin of the casing defines two apertures, and the bolts are driven into the apertures of the panel and the apertures of the casing.

\* \* \* \* \*